Figures 1, 2:
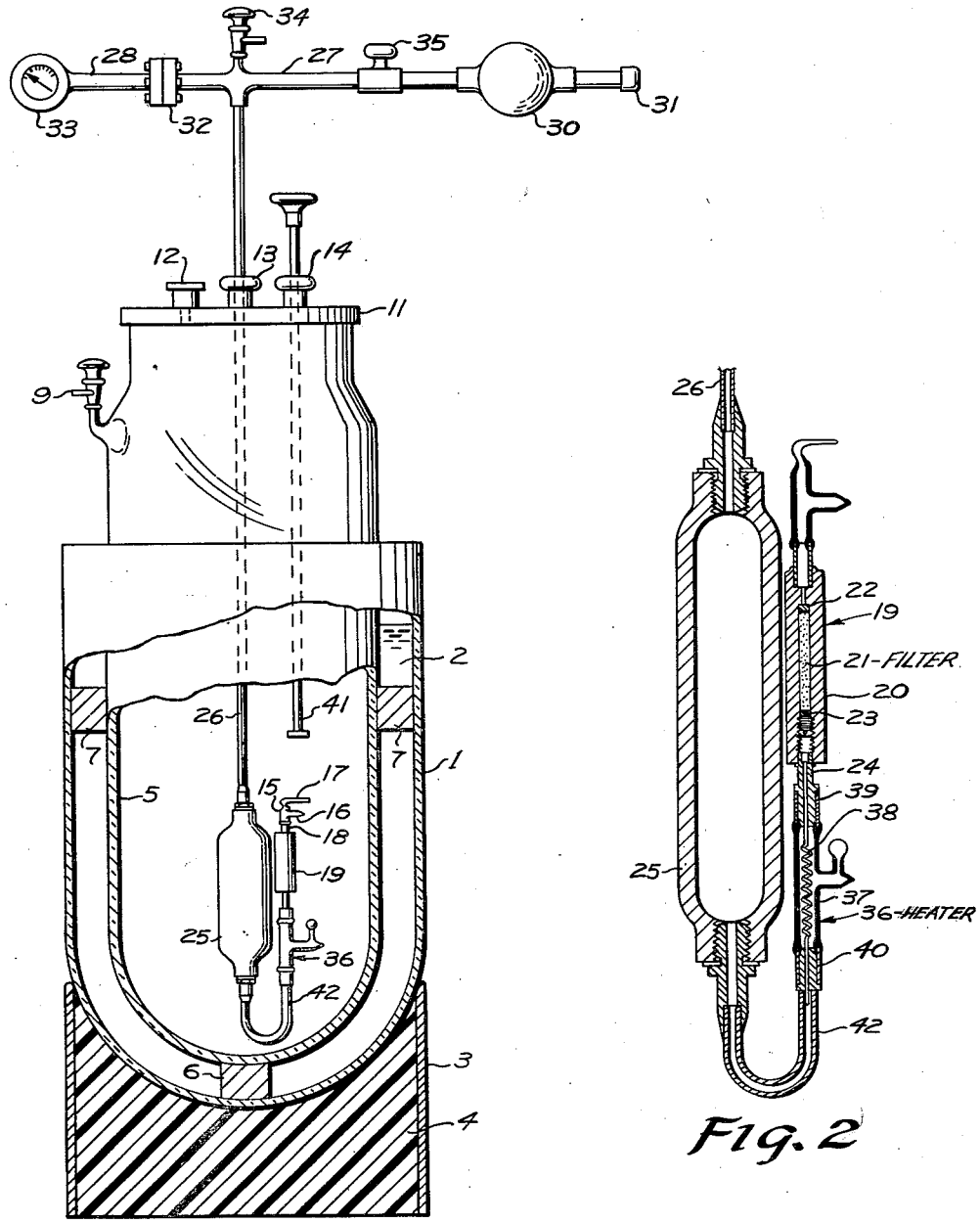

INVENTOR.
ALVIN F. HILDEBRANDT
BY
ATTORNEYS

United States Patent Office 3,192,730
Patented July 6, 1965

3,192,730
HELIUM REFINING BY SUPERFLUIDITY
James E. Webb, Administrator of the National Aeronautics and Space Administration, with respect to an invention of Alvin F. Hildebrandt
Filed Feb. 5, 1963, Ser. No. 256,484
8 Claims. (Cl. 62—15)

The present invention relates to a process for the production of ultra-pure helium. More particularly, the present invention relates to a process for refining helium in which impurities such as hydrogen, nitrogen and oxygen are removed by filtering these substances from the helium while the helium is in a condition which renders it especially suitable for such filtration.

In the past, helium has been purified by various techniques including diffusion, gettering procedures, and a variety of chemical means. These processes are costly and are incapable of producing helium of the purity obtained according to the practice of the present invention. As is well known to those skilled in the art, a growing need has developed for highly refined or ultra-pure helium. For example, such helium is particularly useful in gas chromatography.

Thus, it is a principal object of the present invention to provide a simple and economical process for producing ultra-pure helium.

It is another object of the present invention to provide an apparatus and process wherein helium is purified by filtration.

It is a further object of the present invention to provide an apparatus and process for producing ultra-pure helium wherein the helium is first brought to the lambda II state, i.e., below the lambda point, and then passed through a suitable filter to remove impurities.

Other objects and advantages of the present invention, it is believed, will be apparent from the following description of specific embodiments thereof when read in connection with the drawings.

Briefly, the present invention comprises bringing liquid helium to the lambda II state and then filtering this helium through a filter having pore sizes which permit the passage of substantially only helium.

Helium in the lamba II state is often referred to as helium II or superfluid helium. The latter designation will often be used in the following description.

Superfluid helium is prepared by bringing helium to a temperature below the lambda point at 2.19° K. and extremely low pressures. At this point, the superfluid form appears. Superfluid helium has an extremely low viscosity, less than about $10^{-11}$ poise, as compared with the normal viscosity for liquid helium which is greater than $10^{-6}$ poise. This extremely low viscosity permits superfluid helium to pass through tightly packed filters with relative ease. Thus, since the major impurities present in superfluid helium are frozen solids having very low vapor pressures, these impurities may be removed by filtration. Furthermore, since superfluid helium has a viscosity of practically zero, it will flow through a filter having extremely fine pores which filter will stop other gases or cause them to diffuse through the filter thousands of times slower than superfluid helium.

A suitable filter for use in the present invention is a filter bed comprising a compacted means of iron oxide particles having a particle size of about 10–15 microns. As previously noted, almost all impurities are solids at superfluid helium temperatures, and are blocked by the extremely fine pores between the iron oxide particles. Although the vapor pressures of the impurities are extremely low, single atoms are occasionally liberated, but these atoms are arrested by the iron oxide filter particles when they collide therewith and this further reduces the flow of impurities through the filter.

The present invention is further useful in separating isotopes of helium. For example, helium 3, which exists in minute amounts together with the most common isotope, helium 4, may be separated by the process of this invention. Although helium 3 is a liquid at superfluid helium temperatures and does not adhere to iron oxide particles, it is not superfluid, i.e., it has a relatively high viscosity, and flows through the filter much less rapidly than superfluid helium 4. In the present description, all reference to helium designates helium 4 unless otherwise indicated.

In one embodiment of the present invention, the filtering process is accelerated by use of the fountain effect by slightly heating the helium on the effluent side of the filter.

Referring now to the drawings:
FIGURE 1 illustrates, in partial section, the apparatus which may be used in the present invention.
FIGURE 2 is a detailed illustration of the filtration and collection units of the apparatus of the present invention in which these units are provided with means for employing the fountain effect.

The apparatus illustrated in FIGURE 1 comprises an outer shell 1 containing liquid nitrogen 2. Shell 1 is supported by a cylindrical stand 3 which is filled with tar 4. An inner shell 5 is supported within shell 1 by bottom support 6 and is provided with a plurality of separating means 7. Inner shell 5 is substantially filled with liquid helium. A vent 9 is provided on shell 5. Cap 11 seals shell 5 in airtight relation therewith. Cap 11 is provided with three port members 12, 13 and 14. Breaker rod 41 extends through port 14 in airtight relation therewith.

A filter apparatus including a glass fitting 15 having a vent 16 and a break-tip 17 is positioned within shell 5. Fitting 15 is connected by tube 18 to a filter assembly indicated generally by numeral 19.

Filter assembly 19, as illustrated in more detail in FIGURE 2, comprises an outer shell 20 which contains a bed of fine grains of filter material, e.g., iron oxide, 21. The bed of filter particles 21 is closed at each end by sintered iron plugs 22 and 23. The lower end of shell 20 is provided with tube 24. Preferably, tubes 18 and 24 are welded to shell 20. Fitting 15 is preferably fabricated from glass, tube 18 from a material having the same coefficient of expansion as glass such as Kovar, while shell 20 and tube 24 are preferably fabricated from steel.

Optionally, the apparatus may be provided with a means indicated generally by numeral 36 for heating the helium on the effluent side of filter 19. Heating means 36 comprises a housing 37 which encloses a tube 38 which has a dark or heat absorbing surface. In this embodiment, housing 37 is preferably attached to tube 24 by a tube 39 which is preferably fabricated from Kovar.

Housing 37 is preferably fabricated from glass and provided with Kovar connecting tube 40 at its lower end. When the apparatus of the present invention is provided with heating means 36, a suitable heat source (not shown), e.g., a source of infrared light, may be positioned outside shell 1. In this embodiment, shells 1 and 5 are preferably fabricated from a transparent material such as glass. Thus, the infrared light easily passes through shells 1 and 5 and housing 37 to heat coil 38. The heating of coil 38 causes the helium in the coil to become non-superfluid. This, of course, renders the helium incapable of flowing back through filter bed 21 and the process of diffusion will force superfluid helium through filter 19 and into coil 38. Thus, the flow of helium is accelerated.

Filter assembly 19 and, if present, heating means 36 are connected to accumulation chamber 25 by tube 42. Accumulation vessel 25 is also provided with tube 26 which is provided with arms 27 and 28 at its upper end. Arm 27 leads to a high pressure vessel 30 having a safety valve 31. Arm 28 is provided with a pressure transfer diaphragm 32 and a pressure gauge 33. The diaphragm 32 functions to isolate the interior of tube 26 from pressure gauge 33. Tube 26 is further provided with stopcock 34 while tube 27 is provided with stopcock 35.

The operation of this apparatus is described in the following example.

*Example*

Before assembly, filter apparatus 19 was thoroughly cleaned to remove all impurities and heated to 300° C. to remove moisture while stopcock 34 and vent 16 were connected to a vacuum. Connection of stopcock 34 and vent 16 to a vacuum allows moisture on either side of the filter bed 21 to be eliminated. After heating and evacuating, stopcock 34 was closed and vent 16 sealed by melting down its narrow neck. The entire filtering system attached to cap 11 was then lowered into Dewar shells 1 and 5. Shell 5 was filled with liquid helium to a level above accumulation chamber 25, but below vent 9. The space between shell 5 and shell 1 had previously been substantially filled with liquid nitrogen. Cap 11 was then sealed to shell 5.

The liquid helium was then made superfluid by reducing the temperature to below 2.19° K. and evacuating shell 5 by connecting vent 9 to a vacuum pump. After the helium had been made superfluid, breaker rod 41 was pushed down to break break-tip 17. This permitted superfluid helium to enter glass 15 and flow through filter 19. Since substantially only superfluid helium is capable of passing through filter bed 21, which comprised jeweler's rouge, virtually all of the impurities in the helium were removed by filter 19. The hydro-static pressure of the helium in shell 5 caused the superfluid helium to flow into collection chamber 25. 100 cc. helium was collected in chamber 25 after thirty minutes. The entire body of helium in shell 5 was then heated to above the lambda point such that no superfluid helium remained. The helium in chamber 25 was thereby prevented from leaving chamber 25 since, as normal helium, it was incapable of flowing through filter bed 21.

Cap 11 and the attached filter apparatus was then removed as a unit from shell 5. Chamber 25 was then heated to vaporize the helium to cause it to fill pressure vessel 30. Stopcock 35 was then closed to seal the pressure vessel 30 from the remainder of the apparatus.

As previously described, it has been found that the flow of helium may be accelerated by providing the apparatus with heating means 36 and then supplying heat means to 36.

As will readily be apparent to those skilled in the art, the specific embodiments of the present invention which has been described in the foregoing example may be modified in various manners without departing from the scope of this invention. For example, any micro-porous filter having a pore size which is effective to pass superfluid without passing impurities may be used. Given the concept of the present invention, only routine experimentation is required to determine operable filters. The iron oxide filter bed 21 employed in the foregoing example was prepared from Optical London Red Rouge, i.e., particles having a size of about 10–15 microns. However, it is to be understood that these dimensions are indicative only of an order of magnitude and are not to be considered as limitations on the present invention.

The apparatus of the present invention may be fabricated from any suitable materials and materials other than those indicated as being preferred in the foregoing description may be used.

Having fully described the present invention, it is to be understood that it is not to be limited to the specific details set forth, but is of the full scope of the appended claims.

I claim:

1. A process for refining helium by separating impurities which are solids under conditions at which said helium is superfluid comprising bringing helium to the lambda II state; and passing said helium through a filter, said filter having pore sizes sufficiently large to pass said helium in the lambda II state but sufficiently small to substantially prevent the passage of impurities.

2. A process for refining helium by separating impurities which are solids under conditions at which said helium is superfluid comprising subjecting said helium to a temperature of less than about 2.19° K. and reduced pressure whereby superfluid helium is produced and passing said superfluid helium through a filter, said filter having a pore size which is sufficient to permit said superfluid helium to pass therethrough, but insufficient to permit the passage of impurities.

3. A process for refining helium by separating impurities which are solids under conditions at which said helium is superfluid comprising subjecting said helium to reduced temperature and pressure such that superfluid helium having a viscosity of less than about $10^{-11}$ poise is produced and passing said superfluid helium through a filter having a pore size sufficient to permit the passage of said superfluid helium, but insufficient to permit the passage of impurities.

4. A process for refining helium by separating impurities which are solids under conditions at which said helium is superfluid comprising reducing said helium to superfluid helium having a viscosity of less than about $10^{-11}$ poise and passing said superfluid helium through a filter having a pore size on the order of about 10–15 microns.

5. A process for refining helium by separating impurities which are solids under conditions at which said helium is superfluid comprising reducing said helium to superfluid helium having a viscosity of less than about $10^{-11}$ poise and passing said helium through a filter comprising compacted particles of iron oxide, said particles having the particle size of about 10–15 microns.

6. A process for refining helium by separating impurities which are solids under conditions at which said helium is superfluid comprising reducing said helium to superfluid helium having a viscosity of less than about $10^{-11}$ poise, passing said superfluid helium through a filter having a pore size sufficient to pass said superfluid helium but insufficient to pass impurities and heating said superfluid helium after it passes through said filter to a degree such that it is not superfluid.

7. A process for refining normal helium by separating impurities which are solids under conditions at which said helium is superfluid comprising reducing said normal helium to superfluid helium having a viscosity of less than about $10^{-11}$ poise, passing said superfluid helium through a filter, said filter having a pore size sufficient to pass superfluid helium, but insufficient to pass impurities, heating said superfluid helium after it passes through said filter to a degree such that it is not superfluid, and then heating said helium to a degree such that it vaporizes.

8. A process for refining normal helium containing impurities selected from the group consisting of oxygen, nitrogen, hydrogen and mixtures thereof, comprising reducing said normal helium to superfluid helium having a viscosity of less than about $10^{-11}$ poise, and passing said superfluid helium through a filter having a pore size sufficient to pass said superfluid helium, but insufficient to pass said impurities.

References Cited by the Examiner

UNITED STATES PATENTS 2,982,106  5/61  Ambler ---------------- 62—9
3,057,167  10/62  Yendall ---------------- 62—11
3,098,732  7/63  Dennis ---------------- 62—9

OTHER REFERENCES

Helium Three, Daunt, Ohio State Univ. Press, 1960, emphasis on pp. 148, 149, QD 181.H4 S9.

Low Temperature Physics and Chemistry, Dillinger, Univ. of Wis. Press, 1958, particular emphasis pp. 29–32 and 146–148, QC 278 25 1957.

Liquid Helium, Atkins, Comb. Univ. Press, 1959, with particular emphasis pp. 9, 10, 94, 95, 291, 292.

NORMAN YUDKOFF, *Primary Examiner.*